US007496026B2

(12) United States Patent
Hanks

(10) Patent No.: US 7,496,026 B2
(45) Date of Patent: Feb. 24, 2009

(54) OPTICAL DISC AND METHOD OF PRINTING OPTICAL DISC

(75) Inventor: Darwin M. Hanks, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 738 days.

(21) Appl. No.: 11/012,831

(22) Filed: Dec. 14, 2004

(65) Prior Publication Data
US 2006/0126483 A1 Jun. 15, 2006

Related U.S. Application Data

(60) Provisional application No. 60/635,091, filed on Dec. 11, 2004.

(51) Int. Cl.
*G11B 7/00* (2006.01)
(52) U.S. Cl. .......... 369/275.3; 369/275.4; 369/44.28; 369/53.28
(58) Field of Classification Search .......... 369/44.25, 369/44.26, 53.29
See application file for complete search history.

(56) References Cited

U.S. PATENT DOCUMENTS

| 3,409,777 | A | * | 11/1968 | Cohen et al. .......... 250/203.1 |
| 3,426,337 | A | * | 2/1969 | Cordano et al. .......... 360/77.03 |
| 4,027,217 | A | | 5/1977 | Harman |
| 4,587,579 | A | * | 5/1986 | Cocke et al. .......... 360/75 |
| 4,967,286 | A | | 10/1990 | Nomula et al. |
| 5,182,741 | A | | 1/1993 | Maeda et al. |
| 5,398,231 | A | | 3/1995 | Shin et al. |
| 5,498,509 | A | | 3/1996 | Shin et al. |
| 5,608,717 | A | | 3/1997 | Ito et al. |
| 5,608,718 | A | | 3/1997 | Schiewe |
| 5,627,895 | A | | 5/1997 | Owaki |
| 5,675,570 | A | | 10/1997 | Ohira et al. |
| 5,688,173 | A | | 11/1997 | Kitahara et al. |
| 5,729,533 | A | | 3/1998 | Marquardt |
| 5,745,457 | A | | 4/1998 | Hayashi et al. |
| 5,748,607 | A | | 5/1998 | Ohira et al. |
| 5,751,671 | A | | 5/1998 | Koike et al. |
| 5,764,430 | A | | 6/1998 | Ottesen et al. |
| 5,766,495 | A | | 6/1998 | Parette |

(Continued)

FOREIGN PATENT DOCUMENTS

EP 1439537 7/2004

(Continued)

OTHER PUBLICATIONS

International Search Report dated May 31, 2006 (2 pages).

*Primary Examiner*—Muhammad N. Edun

(57) ABSTRACT

A processor-readable medium comprises processor-executable instructions. The instructions are configured for scanning a reference pattern on a disc to determine a first radial position of the laser, wherein the reference pattern is located at a first nominal distance from a center of the disc and extends to a second nominal distance from the center of the disc, wherein the first and second nominal distances are accurate to within a nominal runout tolerance. The instructions are also configured for reading media ID data on the disc only when the radial position is greater than or equal to the first nominal distance plus the nominal runout tolerance and is less than or equal to the second nominal distance minus the nominal runout tolerance.

19 Claims, 12 Drawing Sheets

U.S. PATENT DOCUMENTS

| | | | |
|---|---|---|---|
| 5,781,221 A | 7/1998 | Wen et al. | |
| 5,846,131 A | 12/1998 | Kitahara | |
| 5,875,156 A | 2/1999 | Ito et al. | |
| 5,915,858 A | 6/1999 | Wen | |
| 5,949,752 A | 9/1999 | Glynn et al. | |
| 5,958,651 A | 9/1999 | Van Hoof et al. | |
| 5,959,280 A * | 9/1999 | Kamatani | 369/52.1 |
| 5,967,676 A | 10/1999 | Cutler et al. | |
| 5,997,976 A | 12/1999 | Mueller et al. | |
| 6,019,151 A * | 2/2000 | Wen et al. | 156/387 |
| 6,020,977 A | 2/2000 | Kim | |
| 6,026,066 A | 2/2000 | Maezawa | |
| 6,034,930 A | 3/2000 | Kitahara | |
| 6,074,031 A | 6/2000 | Kahle | |
| 6,102,800 A | 8/2000 | Kitahara et al. | |
| 6,104,677 A | 8/2000 | Kirihara et al. | |
| 6,124,011 A | 9/2000 | Kern | |
| 6,137,753 A | 10/2000 | Grimsley | |
| 6,160,789 A | 12/2000 | Abraham | |
| 6,202,550 B1 | 3/2001 | Lee et al. | |
| 6,264,295 B1 * | 7/2001 | Bradshaw et al. | 347/2 |
| 6,269,071 B1 * | 7/2001 | Van Den Enden et al. | 369/275.4 |
| 6,270,176 B1 | 8/2001 | Kahle | |
| 6,295,261 B1 | 9/2001 | Kim | |
| 6,317,399 B1 | 11/2001 | Ohtani et al. | |
| 6,384,929 B1 | 5/2002 | Miller | |
| 6,386,667 B1 | 5/2002 | Cariffe | |
| 6,403,191 B1 | 6/2002 | Casagrande | |
| 6,440,248 B1 | 8/2002 | Mueller | |
| 6,452,883 B2 | 9/2002 | Chan | |
| 6,469,969 B2 | 10/2002 | Carson et al. | |
| 6,736,475 B2 * | 5/2004 | Youngberg et al. | 347/2 |
| 6,862,033 B2 * | 3/2005 | McClellan | 347/224 |
| 2002/0030705 A1 | 3/2002 | Youngberg et al. | |
| 2002/0191517 A1 | 12/2002 | Honda et al. | |
| 2003/0026175 A1 * | 2/2003 | Otsuka et al. | 369/44.13 |
| 2003/0193864 A1 | 10/2003 | Pate et al. | |
| 2004/0004912 A1 | 1/2004 | Morishima | |
| 2004/0021976 A1 * | 2/2004 | Deeman et al. | 360/75 |
| 2004/0141046 A1 | 7/2004 | Hanks | |
| 2004/0141445 A1 | 7/2004 | Hanks | |
| 2004/0190173 A1 * | 9/2004 | Shimatani | 360/48 |
| 2004/0264305 A1 * | 12/2004 | Watanabe et al. | 369/13.42 |
| 2005/0057639 A1 * | 3/2005 | Van Brocklin et al. | 347/225 |
| 2005/0232113 A1 | 10/2005 | Van Brocklin | |
| 2005/0259260 A1 * | 11/2005 | Wakita | 356/436 |

FOREIGN PATENT DOCUMENTS

| | | |
|---|---|---|
| EP | 1503573 A2 | 2/2005 |
| EP | 1515318 | 3/2005 |
| WO | WO95/34066 | 12/1995 |
| WO | WO 9745833 | 12/1997 |
| WO | WO99/54141 | 10/1999 |

* cited by examiner

238 →

| RADII – DAC COUNT TABLE | | |
|---|---|---|
| STEP # | DAC COUNT | RADIUS (mm) |
| 1st | -400 | 23.467 |
| 2nd | -300 | 23.490 |
| 3rd | -200 | 23.550 |
| 4th | -100 | 23.575 |
| 5th | 0 | 23.600 |
| 6th | 100 | 23.633 |
| 7th | 200 | 23.655 |
| 8th | 300 | 23.705 |
| 9th | 400 | 23.725 |

Fig. 5

OPTICAL DISC AND METHOD OF PRINTING OPTICAL DISC

RELATED APPLICATIONS

This application claims the benefit of the filing date of commonly assigned and co-pending provisional application, entitled "Optical Disc and Method of Printing Optical Disc," Ser. No. 60/635,091, filed Dec. 11, 2004. This patent application is also related to U.S. patent application Ser. No. 10/661,333, filed Sep. 12, 2003 and entitled Calibrating Fine Actuator Using a Reference Pattern, which was a continuation-in-part of U.S. patent application Ser. No. 10/347,074, which was filed on Jan. 17, 2003, and titled "Radial Position Registration for a Trackless Optical Disc Surface".

BACKGROUND OF THE DISCLOSURE

An optical disc, such as a compact disc (CD), is an electronic data storage medium that can be written to and read using a low-powered laser beam. A CD is typically used for electronically recording, storing, and playing back audio, video, text, and other information in digital form. A digital versatile disc (DVD) is another more recent type of optical disc that is generally used for storing and playing back movies because of its ability to store much more data in the same space as a CD.

CDs were initially a read-only storage medium that stored digital data as a pattern of bumps and flat areas impressed into a piece of clear polycarbonate plastic through a complex manufacturing process. Thus, the average consumer often owned a number of CD's that had both desired data (e.g., a few songs they enjoyed on a CD) and undesired data (e.g., the remaining songs on the CD that they disliked). However, average consumers can now put their own data on their own CDs with CD players capable of burning digital data into CD-Rs (CD-recordable discs) and CD-RWs (CD-rewritable discs).

As more and more consumers burn their own CDs, the need for convenient ways to identify the data on such CDs has increased. Methods for labeling the non-data side of optical discs (e.g., CDs, DVDs) with text and images, for example, have continued to develop. Basic methods for labeling a disc include physically writing on the non-data side with a permanent marker (e.g., a SHARPIE marker) or printing out a paper sticker label and sticking it onto the non-data side of the disc. Other physical marking methods developed for implementation in conventional CD players include ink jet, thermal wax transfer, and thermal dye transfer methods. Still other methods use the laser in a conventional CD player to mark a specially prepared CD surface. Such methods apply equally to labeling CDs and DVDs.

A label image can be rendered on the label surface (i.e., the non-data side, or top side) of an optical disc by marking the label surface with a laser beam along concentric circles around the disc. For each circle, spots of constant size and optical density are marked by the laser according to the marking data for that circle. One difficulty in rendering a label image on the non-data side (i.e., label surface) of an optical disc is that there are no markings such as pre-engraved tracks on the non-data side from which radial positioning can be determined. One method for determining radial positioning on the non-data side of an optical disc is the use of a reference pattern on the non-data side. This method is discussed in the related application, "Radial Position Registration for a Trackless Optical Disc Surface", noted above. Still more accuracy in radial positioning may be required for higher label densities.

BRIEF DESCRIPTION OF THE DRAWINGS

Features and advantages of the disclosure will be readily appreciated by persons skilled in the art from the following detailed description of exemplary embodiments thereof, as illustrated in the accompanying drawings, in which:

The same reference numbers are used throughout the drawings to reference like components and features.

FIG. 5 illustrates and exemplary table of radii data and DAC count data.

DETAILED DESCRIPTION OF THE DISCLOSURE

Figure 1:
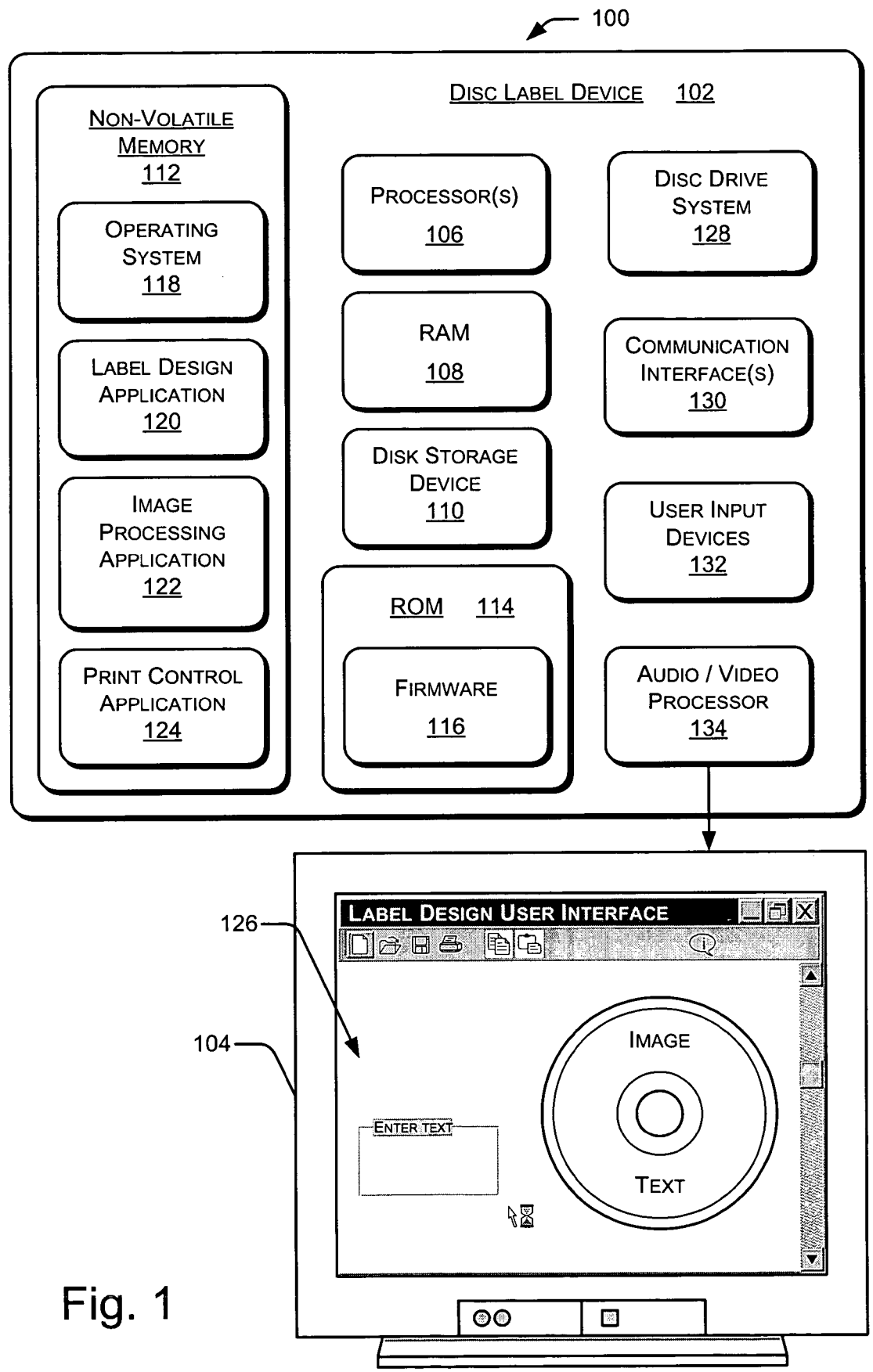
FIG. 1 illustrates an exemplary disc media marking system.

In the following detailed description and in the several figures of the drawing, like elements are identified with like reference numerals.

Overview

The following discussion is directed to disc media marking systems and methods that facilitate optical disc labeling through calibration of a fine actuator to accurately control the radial movement of a marking laser. A reference pattern (e.g., a sawtooth pattern) on the non-data side (or label side) of an optical data storage disc enables optical disc devices to calibrate a fine actuator. The fine actuator controls small radial movements of a focusing lens and marking laser in between larger radial movements provided by a coarse actuator. The sawtooth pattern has a linear variation with the disc radius that is measurable and convertible to distance, enabling calibration of the fine actuator. Other patterns having linear variation with the disc radius are also contemplated such as triangular patterns (i.e., half of a sawtooth pattern), stair step patterns, and so on. Calibration of the actuator is achieved by measuring the pattern, calculating the implied radius from the pattern measurement, stepping the actuator, and repeating the process.

Exemplary System Environment

FIG. 1 illustrates an exemplary disc media marking system 100 suitable for calibrating a fine actuator using a sawtooth pattern. The exemplary disc media marking system 100 includes a disc media marking device 102 and a display device 104. The disc media marking device 102 can be implemented as a stand-alone appliance device for labeling disc media. Alternatively, the disc media marking device 102 can be integrated as part of an optical media player or drive, such as a writable compact disc (CD) player that is implemented to label an optical disc as well as record data onto a CD-R (CD-recordable disc) and/or a CD-RW (CD-rewritable disc). Such writable CD devices may include, for example, a stand-alone audio CD player that is a peripheral component in an audio system, a CD-ROM drive integrated as standard equipment in a PC (personal computer), a DVD (digital versatile disc) player, and any number of similar embodiments.

Disc media marking device 102 includes one or more processors 106 (e.g., any of microprocessors, controllers, and the like) that process various instructions to control the operation of disc media marking device 102 and communicate with other electronic and computing devices. Disc media marking device 102 can be implemented with one or more memory components, examples of which include a random access memory (RAM) 108, a disk storage device 110, and non-volatile memory 112 (e.g., any one or more of a read-only memory (ROM) 114, flash memory, EPROM, EEPROM, etc.).

Disk storage device 110 can include any type of magnetic or optical storage device, such as a hard disk drive, a magnetic tape, a recordable and/or rewriteable compact disc (CD), a DVD, DVD+RW, and the like. The one or more memory components provide data storage mechanisms to store various information and/or data such as configuration information for disc media marking device 102, graphical user interface information, and any other types of information and data related to operational aspects of disc media marking device 102. Alternative implementations of disc media marking device 102 can include a range of processing and memory capabilities, and may include any number of differing memory components than those illustrated in FIG. 1.

Disc media marking device 102 includes a firmware component 116 that is implemented as a permanent memory module stored on ROM 114, or with other components in disc media marking device 102, such as a component of a processor 106. Firmware 116 is programmed and distributed with disc media marking device 102 to coordinate operations of the hardware within disc media marking device 102 and contains programming constructs used to perform such operations.

An operating system 118 and one or more application programs can be stored in non-volatile memory 112 and executed on processor(s) 106 to provide a runtime environment. A runtime environment facilitates extensibility of disc media marking device 102 by allowing various interfaces to be defined that, in turn, allow the application programs to interact with disc media marking device 102. In this example, the application programs include a label design application 120, an image processing application 122, and a print control application 124.

The label design application 120 generates a label design user interface 126 for display on display device 104 from which a user can create a label image to be rendered on a disc media, such as on an optical disc. A user can specify, or otherwise drag-and-drop text, a bitmap image for background, a digital photo, a graphic or symbol, and/or any combination thereof to create the label image on the user interface 126.

Figure 2:
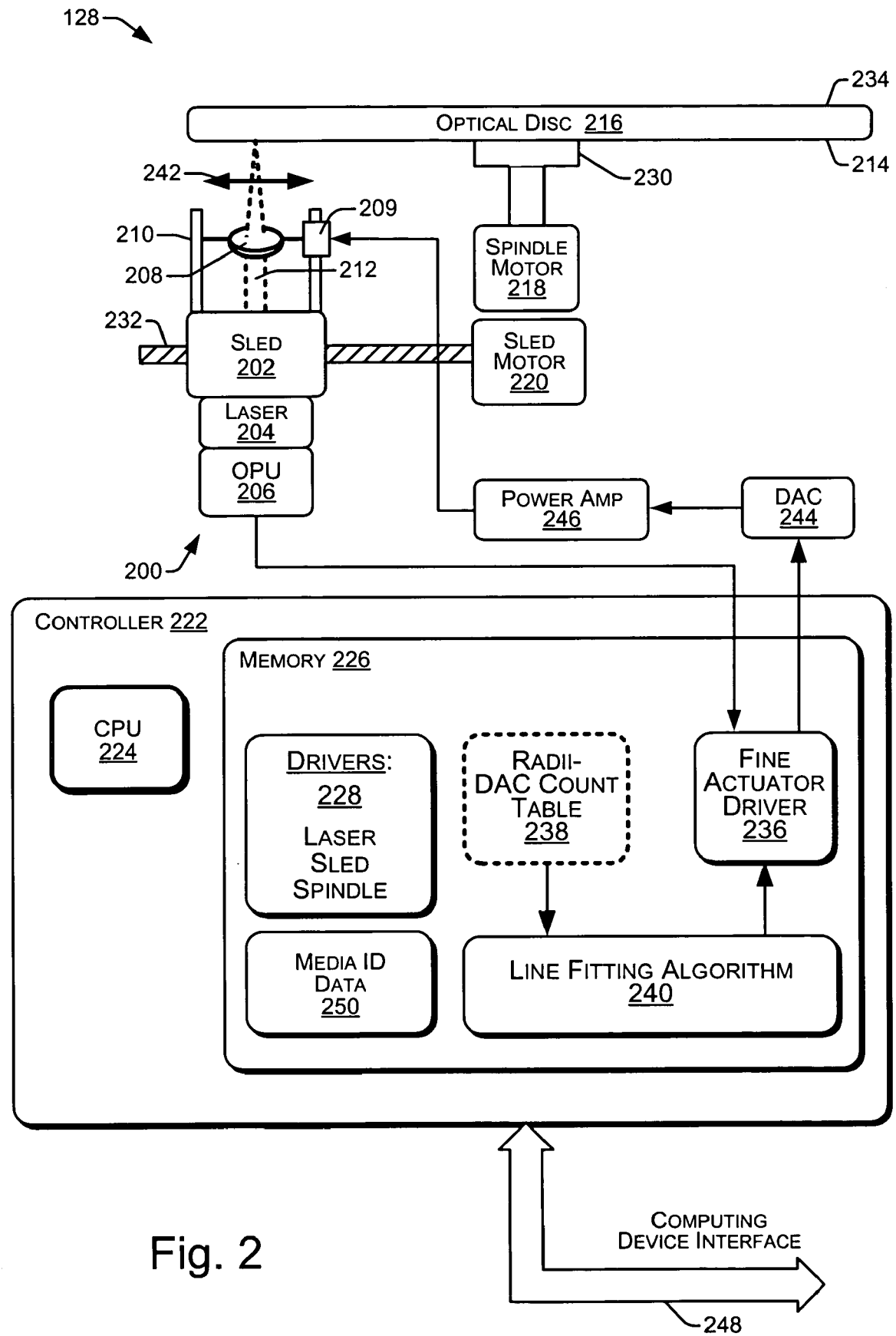
FIG. 2 illustrates an exemplary embodiment of a disc drive system as a component of the exemplary disc media marking system of FIG. 1.
Figure 3:
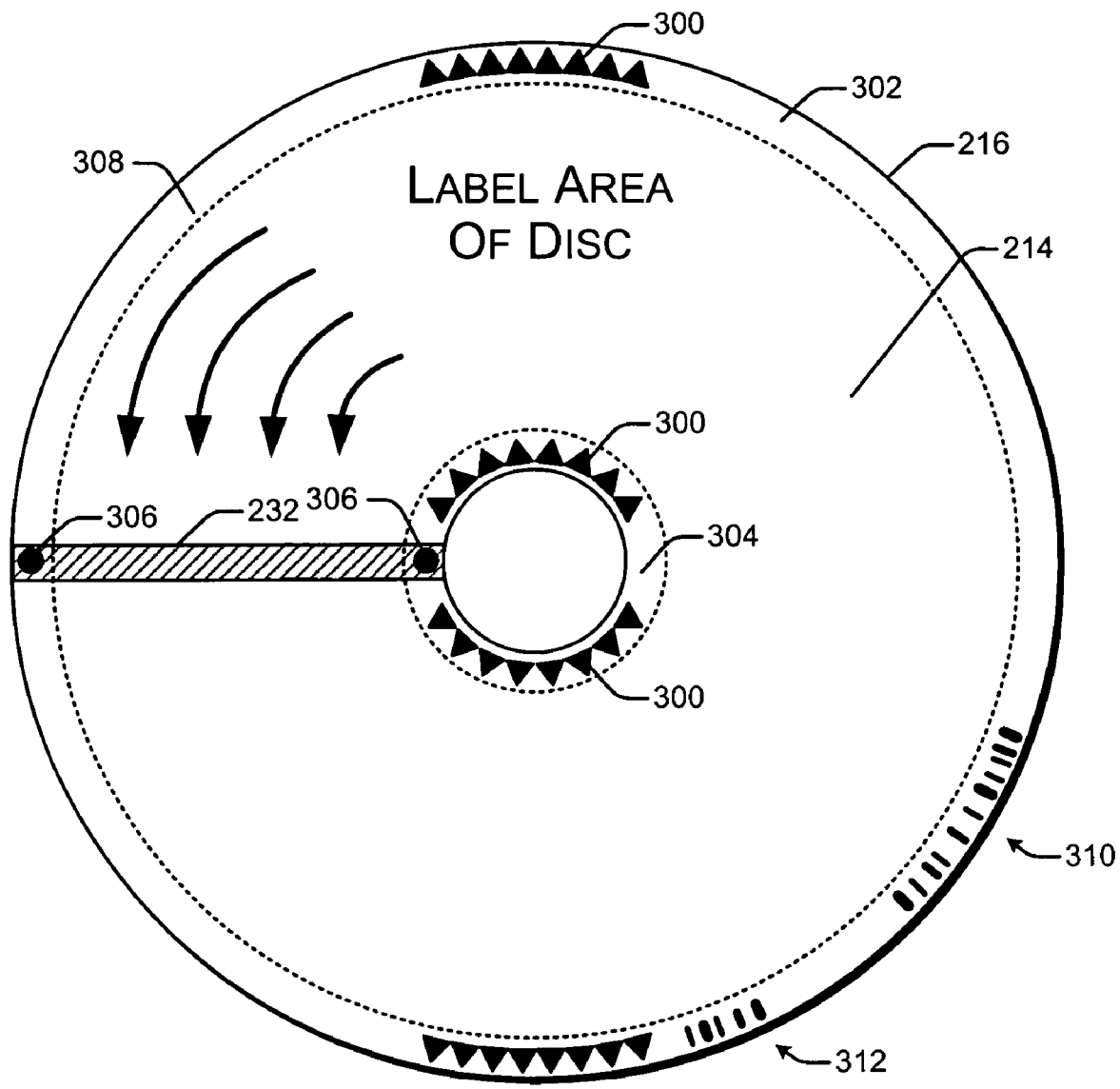
FIG. 3 illustrates an exemplary embodiment of optical disc media having an exemplary reflectivity pattern.

The image processing application 122 processes the label image created with the label design user interface 126 to produce a data stream of label image data and laser control data to control rendering the image on concentric circular or spiral tracks of a disc media, such as disc media 216 (FIGS. 2 & 3). For example, a continuous tone RGB (red, green, and blue) rectangular raster graphic of the label image can be converted to concentric circular tracks. The curved raster is color mapped and separated into the printing color channels KCMY (black, cyan, magenta, and yellow), or grayscale. This data stream is formatted as laser control data and is augmented with other control commands to control the disc media marking device 102 rendering a label on the disc media 216 (FIGS. 2 & 3). A label file is generated that can be communicated to a controller where the label file is parsed to control a labeling mechanism. Alternatively, the concentric circular tracks may be generated and streamed to the disc media marking device 102 one track at a time to utilize host processing with the device's rendering process.

The print control application 124 determines the radius of the first track and the subsequent track spacing. After the radius of the first track and the track spacing is determined, the print control application 124 determines which label image data will correspond to each respective track. The laser mark locations along a particular track are specified in a coordinate system where the concentric circular tracks are defined in coordinates of the radial distance and the distance along each respective track.

Disc media marking device 102 includes a disc drive system 128 that can be implemented to mark on a surface of a disc media (i.e., optical disc), such as to render a label image on a label surface 214 (e.g., the non-data side) of optical disc 216 (FIGS. 2 & 3). The disc drive system 128 is described in greater detail herein below with reference to FIG. 2.

Disc media marking device 102 further includes one or more communication interfaces 130 that can be implemented as any one or more of a serial and/or parallel interface, as a wireless interface, any type of network interface, and as any other type of communication interface. A wireless interface enables disc media marking device 102 to receive control input commands and other information from an input device, such as from a remote control device or from another infrared (IR), 802.11, Bluetooth, or similar RF input device. A network interface provides a connection between disc media marking device 102 and a data communication network which allows other electronic and computing devices coupled to a common data communication network to send label image data and other information to disc media marking device 102 via the network. Similarly, a serial and/or parallel interface provides a data communication path directly between disc media marking device 102 and another electronic or computing device.

Disc media marking device 102 may include user input devices 132 that can include a keyboard, pointing device, selectable controls on a user control panel, and/or other mechanisms to interact with, and to input information to disc media marking device 102. Disc media marking device 102 also includes an audio/video processor 134 that generates display content for display on display device 104, and generates audio content for presentation by a presentation device, such as one or more speakers (not shown). The audio/video processor 134 can include a display controller that processes the display content to display corresponding images on display device 104. A display controller can be implemented as a graphics processor, microcontroller, integrated circuit, and/or similar video processing component to process the images. Video signals and audio signals can be communicated from disc media marking device 102 to display device 104 via an RF (radio frequency) link, S-video link, composite video link, component video link, or other similar communication link.

Although shown separately, some of the components of disc media marking device 102 may be implemented in an application specific integrated circuit (ASIC). Additionally, a system bus (not shown) typically connects the various components within disc media marking device 102. A system bus can be implemented as one or more of any of several types of bus structures, including a memory bus or memory controller, a peripheral bus, an accelerated graphics port, or a local bus using any of a variety of bus architectures. Furthermore, disc media marking device 102 may share a system bus with a host processor.

EXEMPLARY EMBODIMENT

FIG. 2 illustrates an exemplary embodiment of the disc drive system 128 shown in FIG. 1 as a component of the exemplary disc media marking device 102. The disc drive system 128 has a laser assembly 200 that includes a sled 202 which supports a laser 204, an optical pickup unit (OPU) 206, a laser focusing lens 208, a fine actuator 209, and lens supports 210.

A laser beam 212 is generated by the laser 204 and focused onto a label surface 214 of optical disc media 216. The laser beam 212 creates laser marks that correspond to label image data to render an image of the label on the optical disc media 216.

The disc drive system 128 includes a spindle motor 218, a sled motor 220, and a controller 222. In general, controller 222 may be implemented as a printed circuit board employing a combination of various components discussed above with respect to the disc media marking system 100 of FIG. 1. Accordingly, controller 222 includes a processor 224 for processing computer/processor-executable instructions from various components stored in a memory 226. Processor 224 is typically one or more of the processors 106 discussed above with respect to the disc media marking system 100 of FIG. 1. Likewise, memory 226 is typically the non-volatile memory 112 and/or firmware 116 from the disc media marking system 100 of FIG. 1.

Drivers 228, including a laser driver, sled driver, and spindle driver are stored in memory 226 and executable on processor 224. Although these components are represented in the FIG. 2 embodiment as software components stored in memory 226 and executable on processor 224, they may also be firmware or hardware components. In an exemplary embodiment, media ID data 250 on the disc are read by the OPU and may be stored in memory 226.

In an exemplary embodiment, the media ID data 250 may comprise encoded information or settings which may be sensed by the optical pickup unit. Media ID data are described, for example, in commonly assigned patent application Ser. No. 10/836,866, filed Apr. 30, 2004 and entitled Media Label System. In an exemplary embodiment, the media ID data may include information such as safety parameters for safely applying the label to the disc, marking parameters which include minimum and maximum laser power settings, marking speed, disc chemistry, manufacturer, color of the disc and other features desired for creating the label, quality parameters that include information for enhancing the visual quality of the label, and other fields for advantageously creating the label. By this way, discs having different settings or parameter demands may be marked by the same apparatus.

In general, a spindle driver drives the spindle motor 218 to control a rotational speed of disc 216 via spindle 230. Spindle driver operates in conjunction with a sled driver which drives the sled motor 220 to control coarse radial positioning of laser assembly 200 with respect to disc 216 along a sled drive mechanism 232. In a typical implementation, the rotational speed of disc 216 and the radial position of laser assembly 200 are controlled such that laser marks are written on the disc 216 as the label surface 214 moves past the laser beam 212 at a constant linear velocity.

A laser driver controls the firing of laser beam 212 to write laser marks corresponding to a label image onto optical disc media 216. Optical pickup unit (OPU) 206 can be implemented as a photodetector that provides laser focus feedback to the laser driver. Additionally, the laser driver controls the intensity of the laser beam 212 to read data maintained on the data side 234 of the optical disc 216 when the disc is positioned such that the data side 234 passes over the laser beam 212.

A fine actuator driver 236, a radii-DAC count table 238, and a line fitting algorithm 240 are also stored in memory 226. Fine actuator driver 236 and line fitting algorithm 240 are executable on processor 224 to generate and manipulate data in radii-DAC count table 238 to determine the gain of (i.e., to calibrate) fine actuator 209. In general, fine actuator 209 functions to move focusing lens 208 in a radial direction 242 in small increments in between the larger movements from the sled 202 (i.e., coarse actuator). Calibration of fine actuator 209 is achieved through a process involving a DAC 244 (digital to analog converter), a power amplifier 246, a sawtooth reference pattern located on optical disc 216, and various components of the laser assembly 200. The calibration process is discussed in greater detail herein below. Although fine actuator driver 236 and line fitting algorithm 240 are represented in the FIG. 2 embodiment as software components stored in memory 226 and executable on processor 224, they may also be firmware or hardware components.

Computing device interface 248 interfaces the controller 222 of the disc drive system 128 with another electronic or computing device to receive label image data or a label file (not shown). The computing device interface 248 can be implemented as an ATAPI (Advanced Technology Attachment Packet Interface), which is one of many small computer parallel or serial device interfaces. Another common computer interface is SCSI (small computer system interface), which is a generalized device interface for attaching peripheral devices to computers. SCSI defines the structure of commands, the way commands are executed, and the way status is processed. Various other physical interfaces include the Parallel Interface, Fiber Channel, IEEE 1394, USB (Universal Serial Bus), and ATA/ATAPI. ATAPI is a command execution protocol for use on an ATA interface so that CD-ROM and tape drives can be connected via the same ATA cable with an ATA hard disk drive. ATAPI devices generally include CD-ROM drives, CD-recordable drives, CD-rewritable drives, DVD (digital versatile disc) drives, tape drives, super-floppy drives (e.g., ZIP and LS-120), and the like.

As mentioned above, fine actuator driver 236 and line fitting algorithm 240 are configured to generate and manipulate data in radii-DAC count table 238 in order to calibrate fine actuator 209 in a process that involves DAC 244, power amplifier 246, a sawtooth reference pattern located on optical disc 216, and various components of the laser assembly 200. The process generally includes moving the laser assembly 200 to a position so that the laser beam 212 is focused at a known radial location on optical disc 216 and then incrementing the radial location while recording current values used for incrementing the radial location. The known radial location and incremented radial locations each permit the laser beam 212 to scan a sawtooth reference pattern located on the label surface 214 of disc 216.

The fine actuator driver 236 increments a DAC count (i.e., a digital number) being input to the DAC. The DAC count is recorded into table 238. Incrementing the DAC count adjusts the voltage out of the DAC which drives power amplifier 246. In turn, current supplied to fine actuator 209 by power amplifier 246 is incremented. Changes in the fine actuator 209 current cause the fine actuator 209 to make small adjustments to the focusing lens 208 in the radial direction 242. The small adjustments alter the radius position of laser beam 212 on the sawtooth pattern of disc 216.

When the sawtooth pattern is scanned at various radial positions by the laser beam 212, the OPU 206 generates a reflectivity signal corresponding to the sawtooth pattern. The duty cycle of the reflectivity signal changes each time the fine actuator 209 adjusts the radial scan location of the laser beam 212 on the sawtooth pattern. The fine actuator driver 236 converts the duty cycle of the reflectivity signal into a radius value based on the duty cycle information, the known height of the sawtooth pattern, and the radial position of the sawtooth pattern, and stores the radius value in table 238 along with the corresponding DAC count. The process of incrementing the DAC count (which in turn, increments the fine actuator 209 current) and calculating radii from the duty cycle of the resultant reflectivity signal is repeated a number of times until the table 238 has stored a number of samples of the DAC count and the corresponding radii.

Line fitting algorithm 240 then uses the DAC count and the corresponding radii data from table 238 as coordinate data to calculate a line with a slope that best fits the coordinate data. The slope of the best fit line is the gain of the fine actuator 209. That is, the slope of the best fit line calibrates the radial distance that the fine actuator 209 moves the focusing lens 208 for a known current value (i.e., a known current value corresponding to a recorded DAC count) applied to the fine actuator 209.

FIG. 3 illustrates one embodiment of an optical data storage disc 216 having an exemplary reference pattern 300 on a non-data side 214 that enables calibration of fine actuator 209 (FIG. 2). The non-data side 214 (i.e., the label side) of the optical disc 216 is displayed in FIG. 3. The FIG. 3 embodiment shows reference pattern 300 as a sawtooth pattern 300 located in a region on disc 216 at an extreme outer diameter 302 and an extreme inner diameter 304. The sawtooth pattern 300 includes two sections of the pattern spaced 180 degrees apart located either in an extreme outer diameter region 302 or the extreme inner diameter region 304 of the disc 216. Although the sawtooth reference pattern 300 is shown in both locations 302 and 304 in FIG. 3, in typical circumstances the pattern 300 may only be located in one or the other of these locations, and not both. Furthermore, the inner and outer diameters, 302 and 304, are preferred locations for a reference pattern 300 in order that the label area of the disc 216 can remain free for labeling. However, it is noted that this description is not intended to limit the location of reference patterns to the inner and outer diameters 302 and 304 of disc 216, and that such patterns might also be located elsewhere on disc 216.

In an exemplary embodiment, the disc 216 may also include various media ID data 310 features located in one or the other of the outer region 302 or the inner region 304. In an exemplary embodiment, the media ID data 310 features are located in angular positions between the two reference patter 300 locations. The media ID data may be formed on the disc by any suitable means, for example creating pits in the surface or marking the surface by photo-imaging, etching, embossing or silk screen. In an exemplary embodiment, when a laser and detector are positioned to sense or read the saw-tooth patterns, laser and detector will generally be in a position at or near a position at which the media ID features may be read. The disc may also include index markings 312, the relative position of with respect to which the media ID data 310, pattern 300 and other features located on the disc may be known. In an exemplary embodiment, the index markings 312 may be formed by photo-imaging, etching, embossing or silk screen. The index markings 312 and media ID data may be located at a radial distance from the inner diameter edge of the hole in the center of the disc and are at a radial location about equal to the radial location of the patterns 300, so that when the index marks are detectable, the patterns 300 and media ID data 310 may also be detectible.

FIG. 3 further illustrates part of the sled mechanism 232 shown in FIG. 2 over which a sled 202 carries a laser assembly 200. At either end of this sled mechanism 232, and in both the extreme outer diameter 302 and extreme inner diameter 304 regions of disc 216, a laser spot 306 is shown. Direction arrows 308 indicate the direction of rotation of disc 216. Although not to scale, laser spot 306 is intended to illustrate how a reference pattern 300 is scanned as the disc 216 rotates the pattern 300 and other media ID data past the laser spot 306, either on the extreme inner diameter 304 or the extreme outer diameter 302 of the disc 216.

The sawtooth reference pattern 300 (see also FIGS. 4-8) can be formed on disc 216 by various processes such as silk screening, etching or embossing. The dark patterned areas of reference pattern 300 represent dull areas of low reflectivity on disc 216 (as shown in FIGS. 4-8), while the light patterned areas (i.e., the areas that are not marked) represent shiny areas of high reflectivity on disc 216 (also shown in FIGS. 4-8). In general, scanning areas of varying reflectivity on a disc 216 generates a reflectivity signal through the OPU 206 (FIG. 2) whose amplitude changes in response to the changing reflectivity of the disc 216.

In an exemplary embodiment, the media ID data may represent encoded information relating to various disc characteristics, including color, chemistry, proper disc speed for printing the disc, the manufacturer and other information which may be desirable to be known for proper operation of the printing system.

Figure 4:
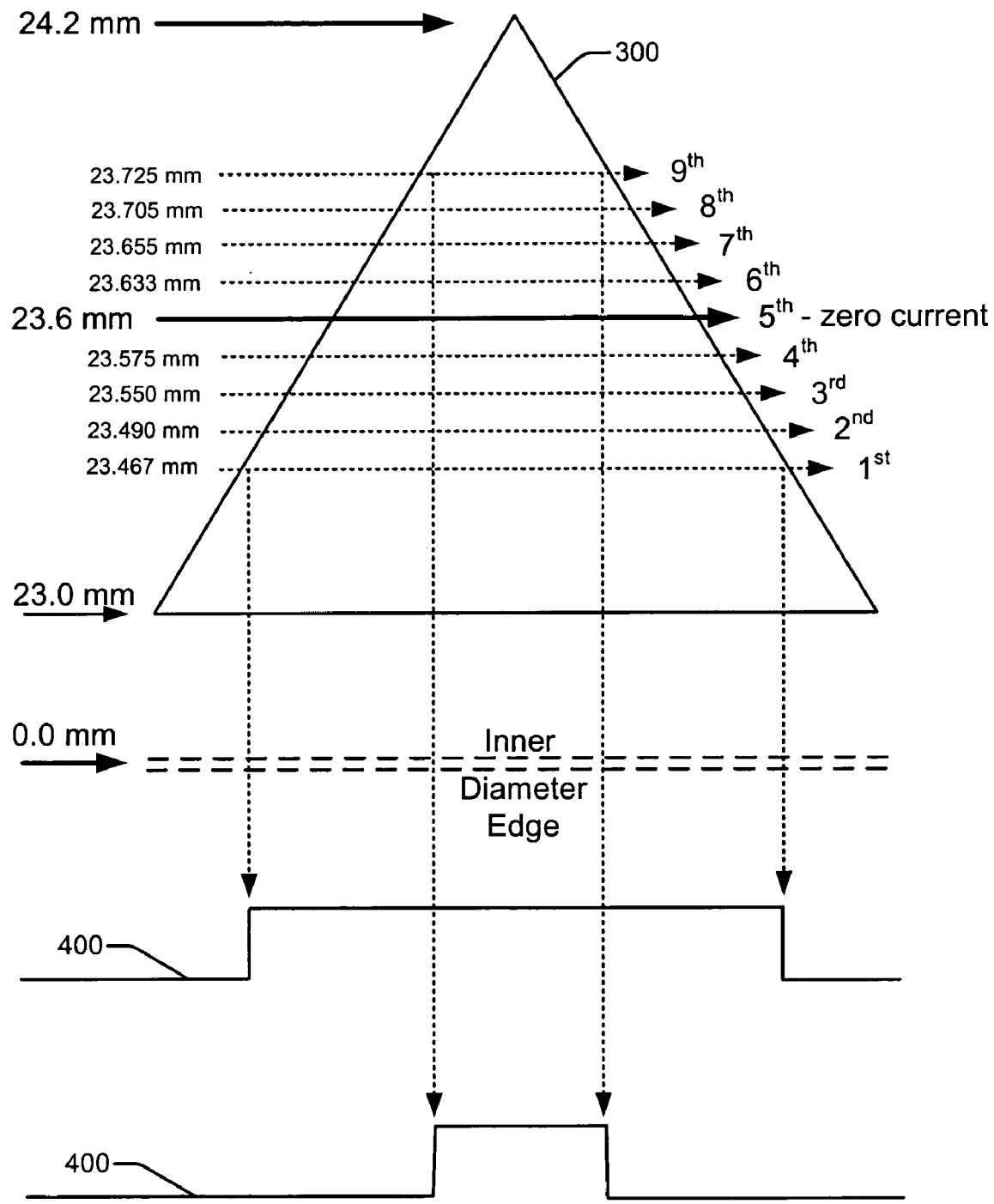
FIG. 4 illustrates an exemplary calibration process including different scanning paths across a sawtooth reference pattern and exemplary reflectivity signals.

As illustrated in FIG. 4, the sawtooth pattern 300 has a known height and is located at a known radial position on optical disc 216. The sawtooth pattern 300 is shown in FIG. 4 beginning at 23.0 millimeters from the inner diameter edge (i.e., the hole) of the optical disc 216. The height of the sawtooth pattern 300 shown in FIG. 4 is 1.2 millimeters (i.e., from 23.0 mm to 24.2 mm). Although the location and height of the sawtooth pattern 300 illustrated in FIG. 4 express a preferred implementation of the sawtooth pattern 300, they are not intended as a limitation. Thus, sawtooth pattern 300 might be located closer or farther from the inner edge of optical disc 216 and may be taller or shorter in height. Furthermore, although pattern 300 is illustrated and discussed throughout as being a sawtooth pattern 300, it is to be understood that other patterns that can provide a linear variation with the disc radius that is measurable and convertible to distance, enabling calibration of the fine actuator are also contemplated. Such patterns include, for example, triangular patterns (i.e., half of a sawtooth pattern), stair step patterns, and so on.

FIGS. 4 and 5 illustrate an exemplary calibration process for a fine actuator 209 (FIG. 2) involving 9 increments or steps of the fine actuator 209. FIG. 4 shows 9 different paths across a sawtooth pattern 300 that a scanning laser beam 212 can take during the calibration process. To begin with, a laser beam 212 is moved to a $1^{st}$ location within the sawtooth pattern 300. Typically, the 1$^{st}$ location is one that is a number of fine actuator 209 increments away from a "zero current" location. The "zero current" location is where there is no current being applied to the fine actuator 209 from power amplifier 246, and thus, where the focusing lens 208 is in a normal resting position.

As illustrated in the radii-DAC count table 238 of FIG. 5, a DAC count of zero corresponds to the "zero current" location (i.e., 5$^{th}$ at 23.6 mm) of the sawtooth pattern 300. In order to reduce motion stress and/or excessive heating on the focusing lens 208 and fine actuator 209, incremental steps may be made on either side of the "zero current" location rather than being made all on one side or the other. Accordingly, the calibration process begins by applying a DAC count to DAC 244 that moves the focusing lens 208 (via fine actuator 209) to focus the laser beam 212 at an innermost radial location. This 1$^{st}$ radial location is shown in FIG. 4 as being 23.467 mm from the inner diameter edge of optical disc 216.

The applied DAC count is known, and it corresponds with a known DAC output voltage that will produce a known current value from power amplifier 246 that will drive the fine actuator 209. Thus, the known DAC count is recorded into table 238 as shown in FIG. 5. However, it is understood that a known current value driving the fine actuator 209 might just as readily be recorded and shown in table 238. Furthermore, although the decimal value of "−400" is illustrated as the DAC count value for the 1$^{st}$ step of table 238, the number actually applied to the DAC 244 will be a binary number. However, for illustrative purposes, it is easier to show the DAC count numbers in their decimal equivalent values.

The lower portion of FIG. 4 illustrates two examples of a reflectivity signal 400 that might be generated by OPU 206 from scanning the sawtooth pattern 300 with laser beam 212. Depending on where the scan occurs over the sawtooth pattern 300, the duty cycle of the reflectivity signal 400 changes. For example, FIG. 4 illustrates two different duty cycles for the reflectivity signal 400 when the sawtooth pattern is scanned at inner (e.g., 23.467 mm) and outer (e.g., 23.725 mm) radial locations. Each time the DAC count is incremented, such as shown in table 238 of FIG. 5, the reflectivity signal 400 has a different duty cycle. For each duty cycle, the fine actuator driver 236 is configured to calculate the corresponding radius and record the radius into table 238, along with the corresponding DAC count (or current value) that generated that radius. The radius calculation is based on the known height (e.g., 1.2 mm) of the sawtooth pattern. Thus, FIGS. 4 and 5 illustrate 9 different radii that have been calculated and recorded based on 9 different DAC counts stepped into DAC 244.

In another embodiment, the two sections of the sawtooth pattern 300 spaced 180 degrees apart are used to eliminate errors that might otherwise be generated due to eccentricities in the pattern 300. For example, when the sawtooth pattern 300 is laid down on the optical disc 216, it is possible that it ends up too far from or too close to the inner diameter edge of the optical disc 216. Therefore, subsequent calculations of radii based on an initial "known" radius of the sawtooth pattern 300 would be in error. However, because the sawtooth pattern 300 is laid down on the optical disc 216 as two sections that are 180 degrees apart, any such error can be averaged out. For example, if one section of the sawtooth pattern 300 is laid down too close to the inner diameter edge, the other section of the pattern 300 which is 180 degrees away will be laid down too far from the inner diameter edge by the same amount. Thus, when the fine actuator driver 236 calculates radii from both of the duty cycles of the resultant reflectivity signals, the radii can be averaged to remove this error.

In an exemplary embodiment, the disc may be subject to runout which may be caused by eccentricities in the disc or eccentricities caused by the placement of the patterns and media ID on the disc. In an exemplary embodiment, the runout may be caused by eccentricities in the pattern 300 and/or by manufacturing tolerances for positioning the pattern 300 and/or the media ID data. In an exemplary embodiment, the manufacturing tolerance for the accurate placement of the pattern 300 and media ID data may be determined by a manufacturer or determined in some other manner. In an exemplary embodiment, the pattern 300 are placed at a known distance from the center hole of the disc with a tolerance of + or − some known variation. For example, the pattern may be placed with its inner edge at a distance of about 23 mm from the center hole of the disc. The tolerance may be + or − about 75 microns. In an exemplary embodiment, this may result in a total runout—or variation of the distance of the profile from the center hole of the disc—of as much as about 150 microns from one side of the disc to the other. As a result, the largest expected variation in the distance of the patterns 300 and/or media ID data 310 from the center of a disc may be about 150 microns.

Figure 6:
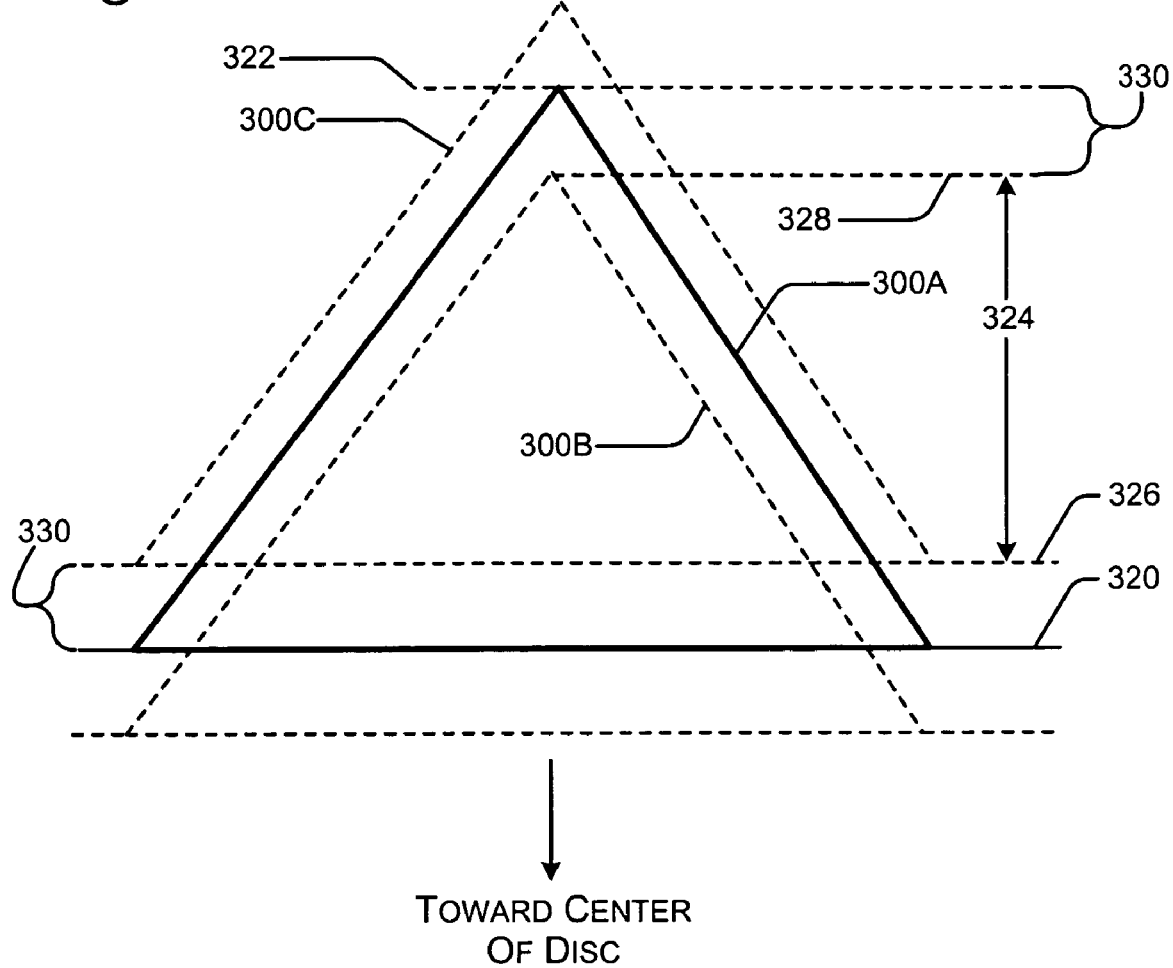
FIG. 6 illustrates a range of relative distances of a pattern from the center of a disc due to eccentricity and/or runout.

FIG. 6 illustrates the range of possible deviation from a nominal distance from a center of a disc which may be experienced by an exemplary portion of a pattern due to the nominal, expected runout tolerance for the pattern on the disc. The inner edge of pattern 300A is located at a position 320, which is at the nominal, expected, intended distance of the pattern from the center of the disc, which in an exemplary embodiment may be about 23 mm from the inner edge of a hole at the center of the disc. The pattern has a radial dimension which extends from the position 320 to a position 322, a distance which in an exemplary embodiment may be about 600 microns. The inner edge of the pattern 300B is at a worst-case expected minimum possible distance from the center of the disc, which in an exemplary embodiment is closer to the center by a distance equal to the runout tolerance 330. In an exemplary embodiment, this may place the inner edge of the pattern 300B at about 22.850 mm, where the runout 330 is about 150 microns, and the outer edge of the pattern at 23.45. The pattern 300C is at a worst-case expected maximum distance possible from the center hole of the disc, which in an exemplary embodiment may be a distance equal to the runout tolerance 330 further away from the nominal, expected distance of 23 mm, or at about 23.150 mm from the center of the disc, where the runout is about 150 microns. At this position, the outer edge of the pattern is at 23.750 mm. In an exemplary embodiment, the read zone 324 extends through the middle half of the radial dimension of the pattern. In an exemplary embodiment, in which a pattern has a radial dimension of 600 microns and a runout tolerance of 150 microns, the read zone 324 may extend from a point 150 microns further from the center than the inner edge of the pattern to a point 450 microns further from the center of the disc than the inner edge of the pattern.

In an exemplary embodiment, the media ID data 310 (FIG. 3) is located at about the same radial distances from the center of the disc as the pattern 300, and is subjected to about the same runout tolerance as the pattern. In an exemplary embodiment, the media ID data 310 (FIG. 3) may be read, sensed and/or recorded when the laser is positioned at a detected and averaged position which is within a reliable read zone 324. An exemplary reliable media ID data read zone 324 may extend from a distance from the center of the disc which is greater than or equal to the expected nominal distance of the inner edge of the pattern plus the runout tolerance, which is shown as position 326 in FIG. 6, and may extend to a distance from the center of the disc which is less than or equal to the expected nominal distance of the outer edge of the pattern minus the runout tolerance, which is shown as position 328 in FIG. 6. This may ensure or increase the likelihood that the media ID marks may be positioned directly below the laser when they are recorded, which may ensure that the media ID data are recorded accurately for proper operation of the system.

In an exemplary embodiment, the reading of the media ID may be negatively affected by the runout or eccentricity of the placement of the media ID or due to eccentricities in the shape or spinning of the disc. In an exemplary embodiment, the runout may be sufficient to cause the laser to miss some of the media ID information on one of the sides of the disc, unless the laser is positioned within the reliable read zone 324 of the pattern 300. In other words, the runout could cause the laser to extend beyond the edge of the media ID data on one half of the disc, while falling within the media ID data on the opposed side of the disc. This may occur even where the position of the laser is determined to be at a radial position within the range of the pattern 300.

In order to ensure or increase the likelihood that the laser is completely over the media ID when they are sensed, read and/or recorded, the index mark may first be found. Finding the index mark may also prompt the system to then calibrate the fine radial positioning actuator by cycling the laser through a plurality of different radial positions along the radial extent of the pattern 300. During calibration, it may be possible to determine the distance from the center hole of the disc the laser is positioned over, based on the response to detecting the pattern 300. In an exemplary embodiment, by determining the radial position of laser with relationship to the expected radial position based on the portion of the pattern over which the laser path moves (for each of the two patterns on opposed sides of the disc)—the radial position may be determined to be about the average of those two distances. Since, in an exemplary embodiment, known runout tolerance 330 may be about 150 microns, the media ID data can be assumed to be completely under the laser at all locations around the disc at which media ID information are located, when the laser is determined to be positioned over a reliable media ID data read zone 324, which extends around the disc at a radial location over the pattern which is determined to be between the inner-most possible position of the radial outer-most portion of the pattern (position 328 in FIG. 6) and the outer-most possible position of the radial innermost portion of the pattern (position 326 in FIG. 6).

Figure 7:
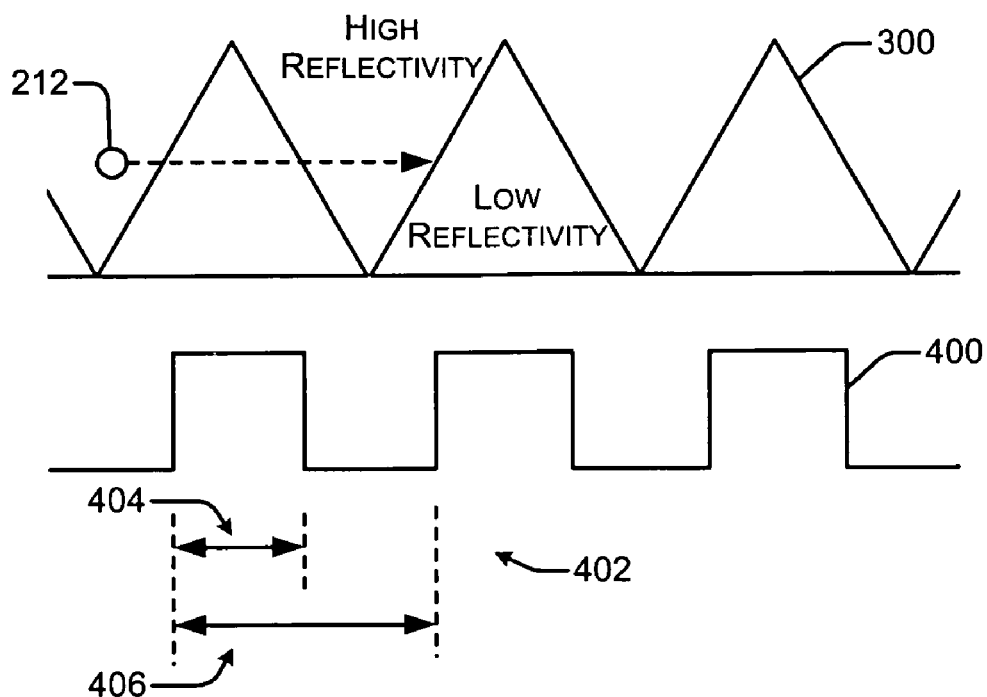
FIGS. 7-9 illustrate exemplary sawtooth patterns and a reflectivity signal responses generated by an optical pickup unit.
Figure 8:
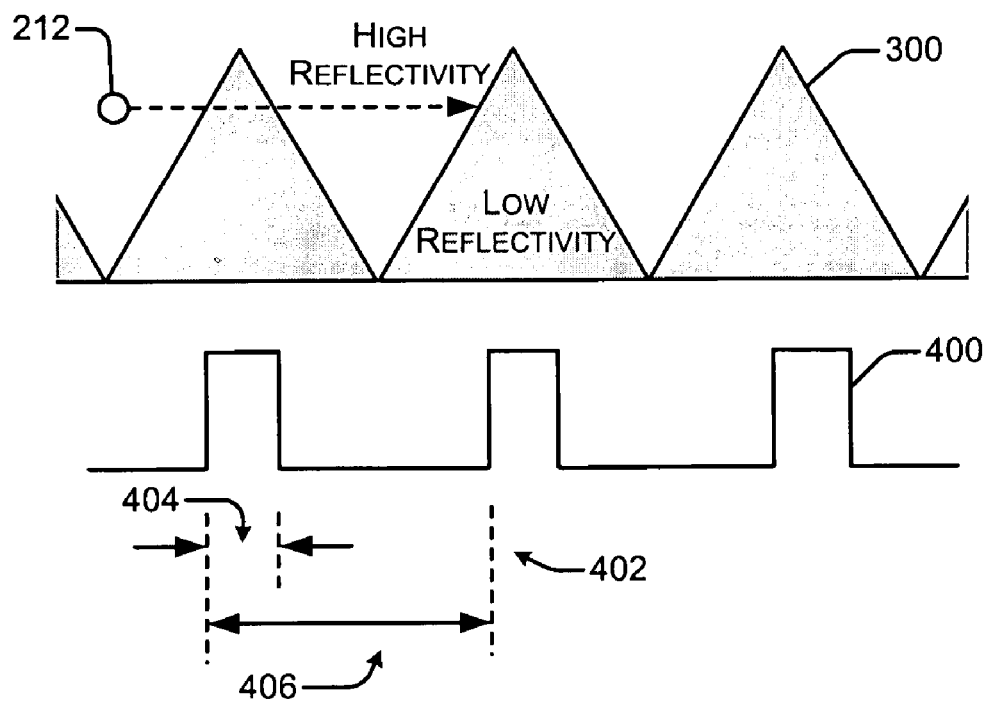
Figure 9:
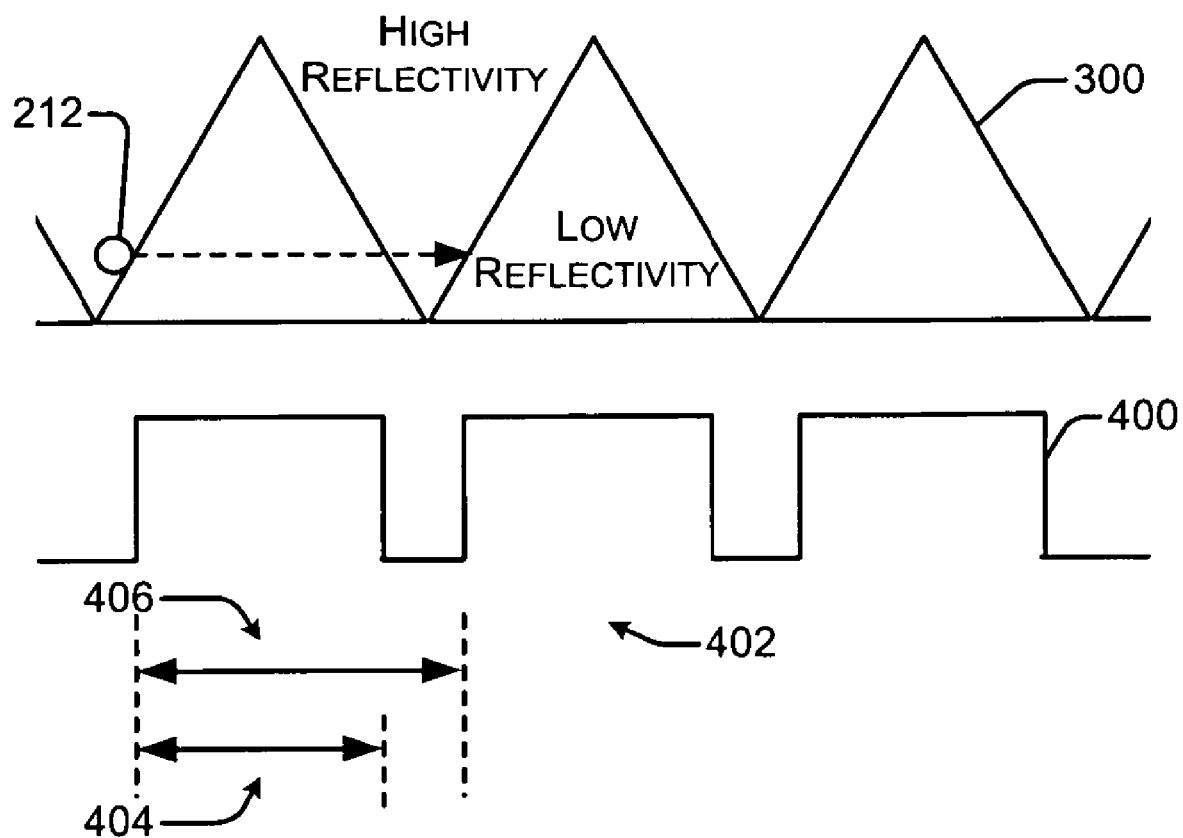

The exemplary sawtooth pattern 300 of FIG. 3 and the generation of a reflectivity signal 400 having a varying duty cycle is further illustrated in FIGS. 7-9. Each of the FIGS. 7-9 illustrates the exemplary sawtooth pattern 300, a reflectivity signal 400 response generated by the OPU 206 (FIG. 2) when the laser assembly 200 scans the pattern with a laser beam 212, and the relative pulse durations (i.e., duty cycles) of the reflectivity signals 400. As shown in FIGS. 6-8, the peaks and valleys of the sawtooth pattern 300 define a slanted interface between the low reflectivity region and the high reflectivity region of optical disc 216.

FIG. 7 illustrates the case where the laser beam 212 is located at the "zero current" radial position, or $5^{th}$ position as shown in FIGS. 4 and 5. As the laser beam 212 moves between the low and high reflectivity regions in the sawtooth pattern 300 on disc 216, the OPU 206 generates a reflectivity signal 400 based on the amount of light reflecting off the disc 216. Because the laser beam 212 in FIG. 7 is centered midway between the peaks and valleys of the sawtooth pattern 300, the reflectivity signal 400 has a (nearly) 50% duty cycle. That is, the ratio of the pulse duration 404 to the pulse period 406 is (nearly) 50%. As indicated above, the radius calculation is made based on the duty cycle, the known height of the saw-tooth pattern 300, and the known, nominal radial position of the inner-most base of the sawtooth pattern 300 and the outer-most top of the saw-tooth pattern 300.

The pulses 402 in the reflectivity signal 400 of FIG. 7 are rectangular in shape (i.e., saturated at the top and bottom) because the laser beam 212 is very small by comparison to the sawtooth pattern 300, and it is therefore either completely within a low reflectivity region or completely within a high reflectivity region as it scans the pattern 300. In addition, the laser beam 212 is traveling very fast relative to the sawtooth pattern 300 and therefore traverses the interface between the low and high reflectivity regions virtually instantaneously. Thus, transitions between high and low signal saturations in the reflectivity signal 400 are also virtually instant, and they appear as straight vertical lines.

FIG. 8 illustrates the case where the laser beam 212 is located higher on the sawtooth pattern 300 than the "zero current" radial position. FIG. 8 may represent, for example, the $9^{th}$ position as shown in FIGS. 4 and 5. Thus, the laser beam 212 is at a radial distance that is farther away from the inner diameter of the disc 216. It is evident from FIG. 8 that the duty cycle of the resultant reflectivity signal 400 is less than it is in the FIG. 7 example. The fine actuator driver 236 calculates a corresponding radius based on the duty cycle and the height of the sawtooth pattern 300, and records the radius into table 238 along with the corresponding DAC count (or current value) that generated that radius.

FIG. 9 illustrates the case where the laser beam 212 is located lower on the sawtooth pattern 300 than the "zero current" radial position. FIG. 9 may represent, for example, the $1^{st}$ position as shown in FIGS. 4 and 5. That is, the laser beam 212 is at a radial distance that is closer to the inner diameter of the optical disc 216. Again, it is evident that the duty cycle of the resultant reflectivity signal 400 is different than those of FIGS. 7 and 8. The fine actuator driver 236 calculates a corresponding radius based on the different duty cycle and the height of the sawtooth pattern 300, and records the radius into table 238 along with the corresponding DAC count (or current value) that generated that radius.

After the fine actuator driver 236 increments the DAC count a certain number of times (e.g., 9 different increments in this case) and creates the table 238 containing the DAC count and radii data, the line fitting algorithm 240 uses the data as coordinate data to calculate a line with a slope that best fits the coordinate data. The slope of the best fit line calibrates the radial distance that the fine actuator 209 moves the laser beam 212 through focusing lens 208 for a known current value (i.e., a known current value corresponding to a recorded DAC count) applied to the fine actuator 209.

Figure 10:
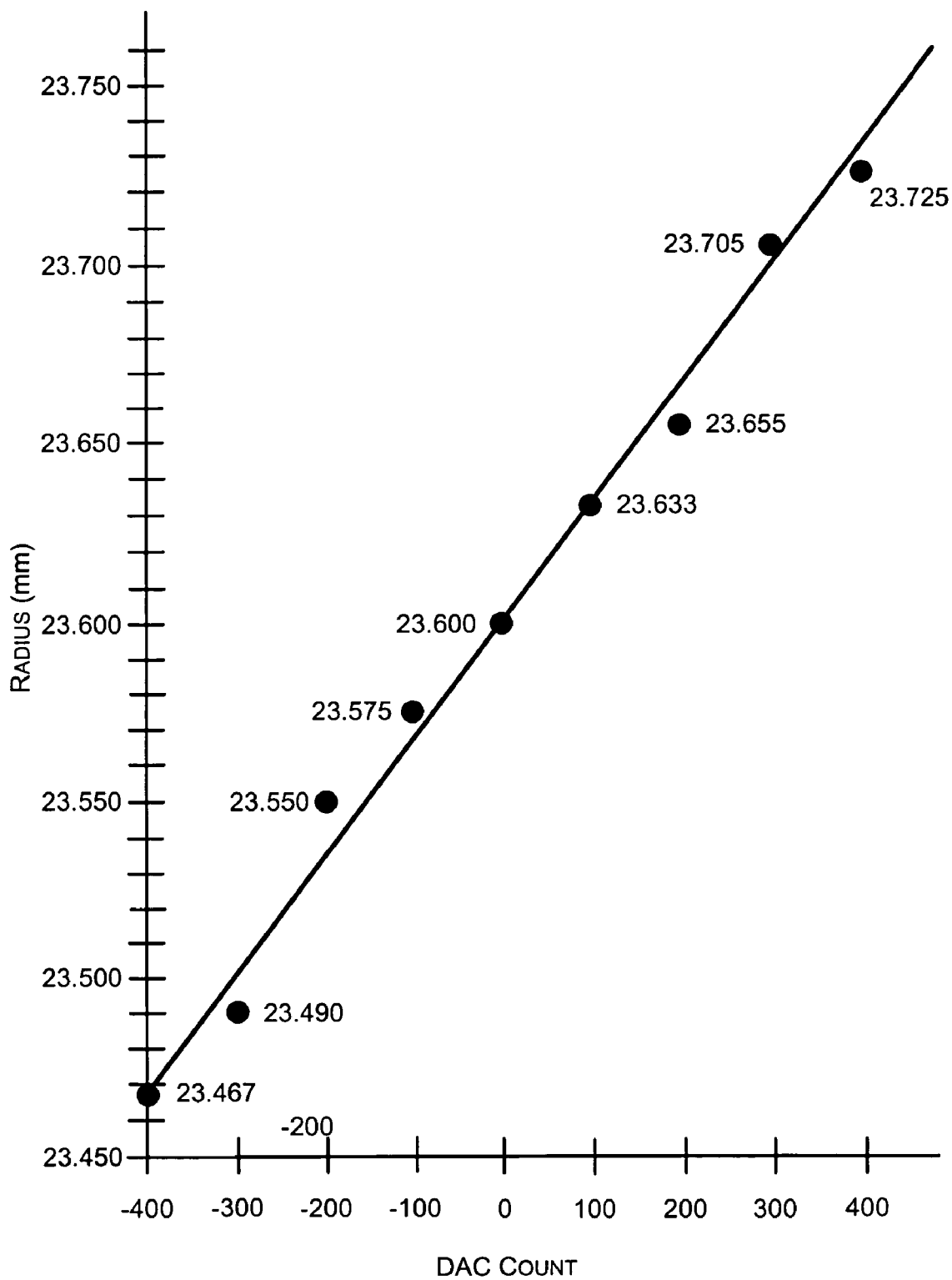
FIG. 10 illustrates an exemplary plot of DAC count data, radii data, and a best fit line calculated using the DAC count data and the radii data.

FIG. 10 illustrates an example of a best fit line calculated by line fitting algorithm 240 based on the values of the DAC count and radii data illustrated in FIGS. 4 and 5. Line fitting algorithm 240 may be, for example, a least squares line fit that calculates the slope of a line for coordinate data that will minimize the squared error of the line compared to the coordinate data. Such line fitting algorithms are well known to those skilled in the art. FIG. 10 illustrates a coordinate plot of the data from table 238, with the DAC count data shown along the X axis and the Radius data (in millimeters) shown along the Y axis. Although the radii data may not all fall exactly in a straight line, the line fitting algorithm 240 generates a best fit line with a slope that best calibrates the gain of the fine actuator 209. In an exemplary embodiment, during the incremental stepping of the laser through various positions along the sawtooth pattern 300, the sensor may sense the media ID during periods in which other angular positions of the outer or inner section 302 or 304 pass by the laser.

In an exemplary embodiment, the controller will control the sensor to detect, read, sense and/or record the media ID data only when the laser is at a position within the profile at which laser is no closer to the outer edge or inner edge of the profile than the maximum runout tolerance, in other words within the reliable read zone 324 (FIG. 6). In an exemplary embodiment, the minimum distance to the edge may be greater than the known runout tolerance, in order to provide an additional degree of reliability.

Exemplary Methods

Example methods for calibrating a fine actuator using a sawtooth pattern in a disc media marking system will now be described with primary reference to the flow diagrams of FIGS. 11-12. The methods apply generally to the exemplary embodiments discussed above with respect to FIGS. 1-10. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM), a read-only memory (ROM), an erasable programmable-read-only memory (EPROM or Flash memory), an optical fiber (optical), and a portable compact disc read-only memory (CDROM) (optical).

Figure 11:
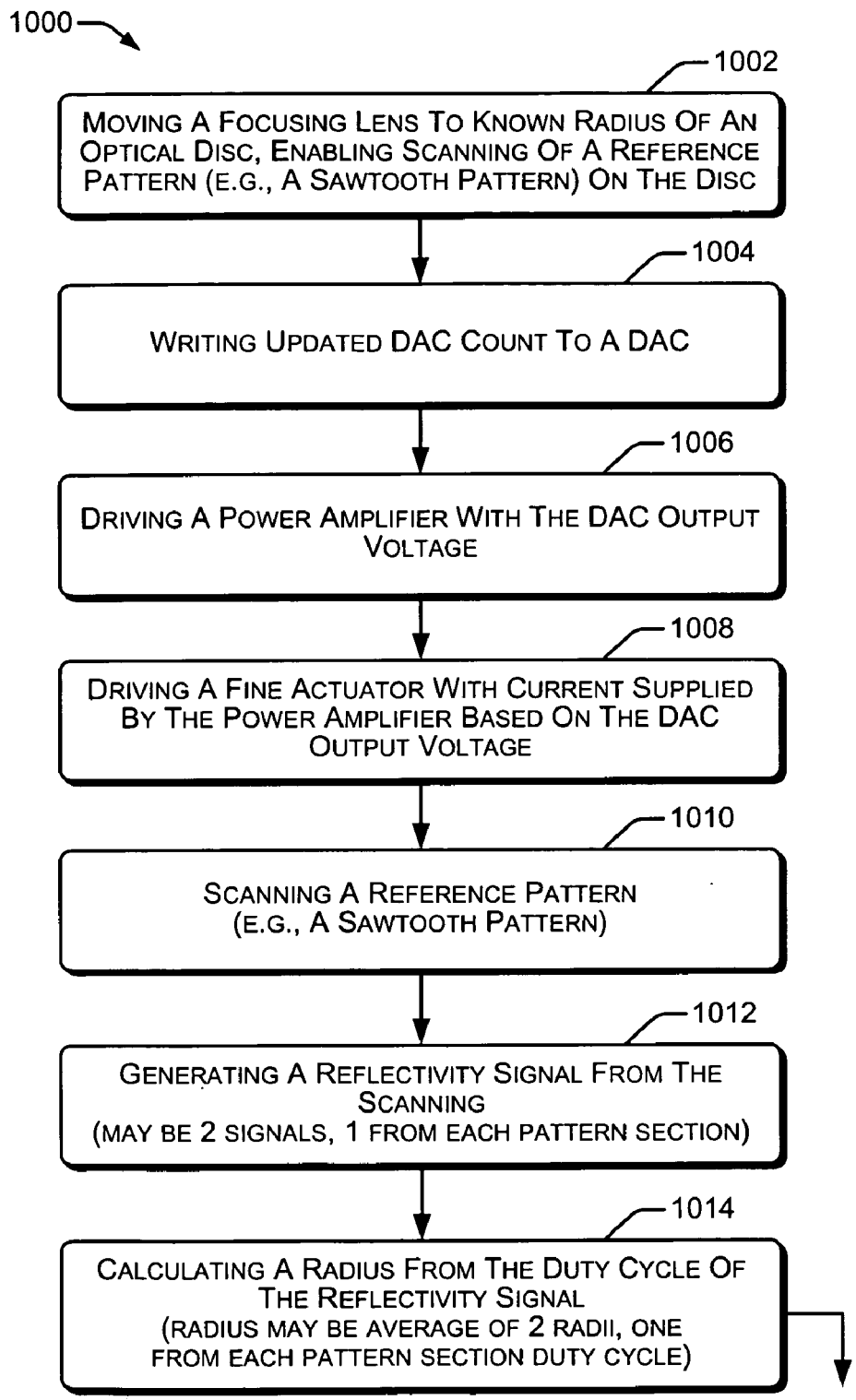
FIGS. 11-12 are flow diagrams illustrating exemplary methods for calibrating a fine actuator using a sawtooth pattern.
Figure 12:
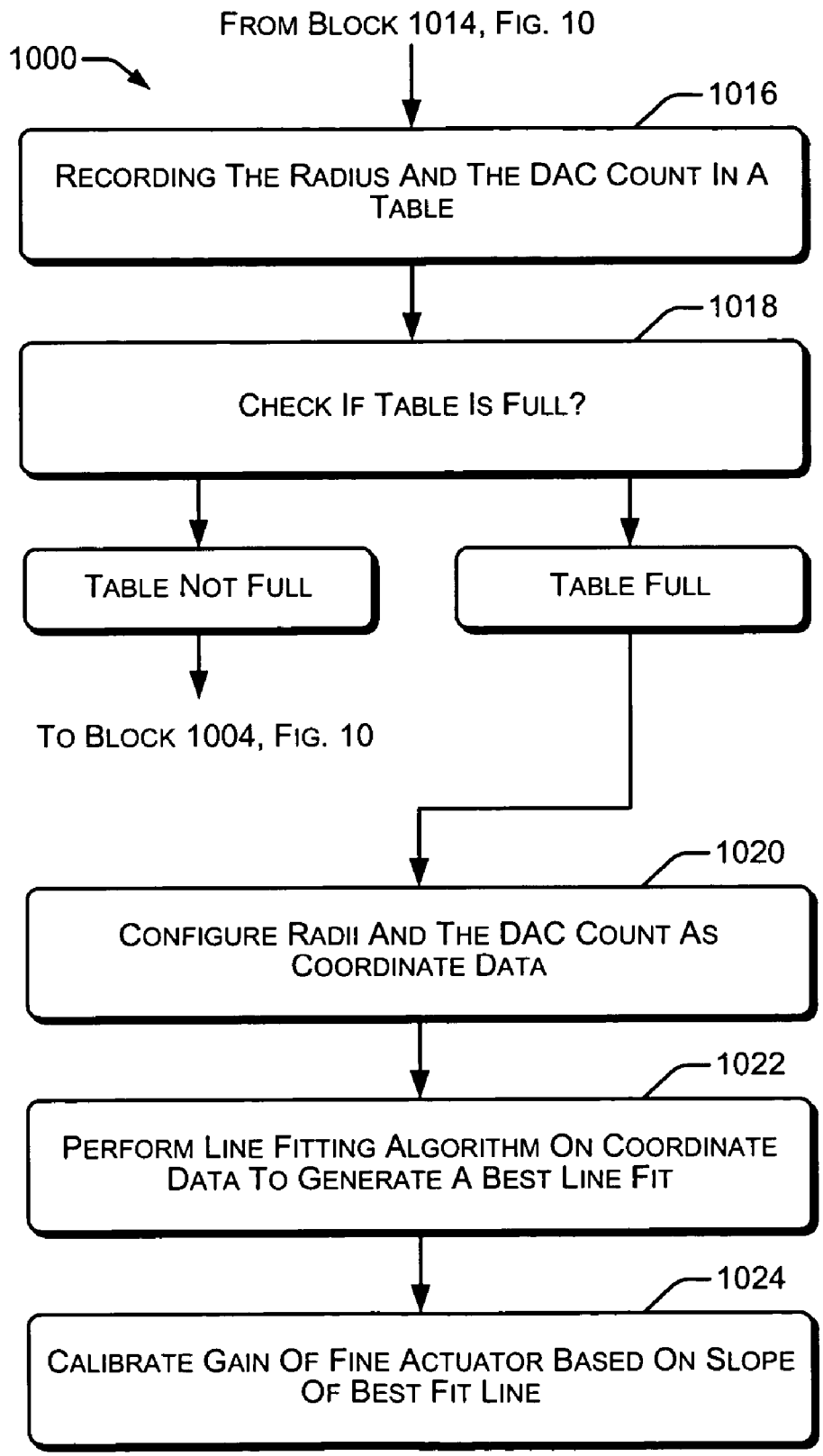

FIGS. 11 and 12 show an exemplary method 1000 for calibrating a fine actuator using a sawtooth pattern in a disc media marking system 100. At block 1002, a focusing lens 208 is moved to a known radial location of an optical disc 216. The known radial location enables the scanning of a sawtooth pattern 300 located on the label side 214 of the disc 216.

At block 1004, an updated DAC count number is written to a DAC 244 (digital to analog converter). The DAC 244 provides an output voltage in response to the DAC count, and drives a power amplifier 246 as shown at block 1006. At block 1008, the power amplifier 246 supplies current which drives a fine actuator 209. The fine actuator is configured to move the focusing lens in fine steps in a radial direction 242. The current supplied to the fine actuator is associated with, and determined by, the DAC count being input to the DAC by way of the power amplifier 246.

At block 1010, a sawtooth pattern 300 located on the optical disc 216 is scanned by a laser beam 212. The location of the scan across the pattern 300 is controlled in part by the fine actuator which controls movement of the focusing lens 208 in a radial direction 242. In one embodiment, the sawtooth pattern 300 includes two sections that are located 180 degrees apart from one another on the optical disc 216. Both sections of the pattern 300 are scanned in this circumstance. At block 1012, a reflectivity signal is generated from the scanning. The reflectivity signal is generated by an OPU 206 (optical pickup unit) according to the reflectivity pattern of the sawtooth pattern 300. The reflectivity signal may be two reflectivity signals where the sawtooth pattern includes two sections that are located 180 degrees apart from one another on the optical disc 216.

At block 1014, a radius is calculated from the duty cycle of the reflectivity signal. Where there are two reflectivity signals, one from each of two sawtooth pattern sections, two radii are calculated and then averaged in order to generate the calculated radius for block 1014. The method 1000 continues on FIG. 12, at block 1016. At block 1016, the radius and the DAC count are recorded into a table. The radius and DAC count are associated within the table as corresponding to one another.

At block 1018, the table is checked to see if it is full. Whether or not the table is full depends in part on how many DAC count increments will be made in the calibration process. The number of increments is preferably 9, but this is not intended as a limitation. Thus, in the described embodiment, the table is full if 9 DAC counts and 9 radii have been recorded into the table. If the table is not full, the method (i.e., calibration process) returns to block 1004 of FIG. 11, and the previously described steps are performed again. If the table is full, the method continues at block 1020.

At block 1020, the radii and DAC count numbers recorded in the table are configured as coordinate data. At block 1022, the coordinate data is manipulated by a line fitting algorithm in order to generate a best line fit for the coordinates. The gain of the fine actuator is then calibrated based on the slope of the best fit line, as shown at block 1024.

Figure 13:
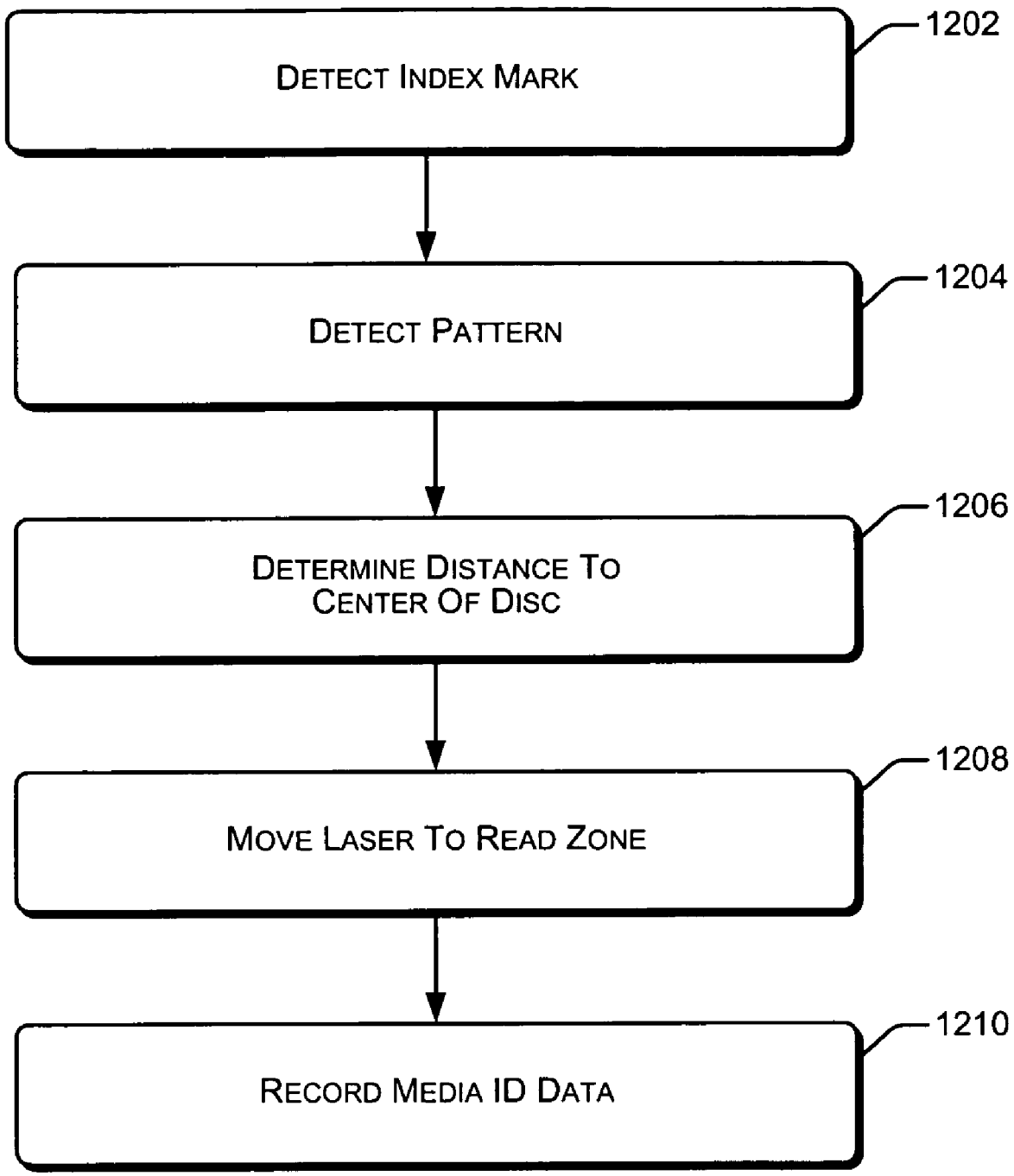
FIG. 13 illustrates an exemplary embodiment of a method for recording media ID data.

FIG. 13 illustrates an exemplary process of reading media ID data. In an exemplary embodiment, the laser is moved to a radial position of the disc where index marks may be detected 1202. In an exemplary embodiment, the laser moves through a region in which index marks are expected to be detected until they are detected and identified. In an exemplary embodiment, the controller positions the laser to detect and determine the radial distance of the laser from the center of the disc by detecting 1204 patterns. In an exemplary embodiment, the controller causes the laser to determine 1206 the radial distance to the center of the disc at a plurality of different radial locations of the pattern. In an exemplary embodiment, the controller moves 1208 the laser to a read zone for the media ID data. In an exemplary embodiment, the movement of the laser may be performed as part of a fine radial actuator calibration process. In an exemplary embodiment, the controller prompts the sensors to detect, sense and/or record 1210 the media ID data when the laser is positioned within the read zone. In an exemplary embodiment, the media ID data reading zone extends from a distance from the center of the disc that is no closer to the inner edge of the pattern than the nominal runout tolerance for the disc and extends to a distance from the center of the disc which is no closer to outer edge of the pattern than the nominal runout for the disc. In an exemplary embodiment, the distance is calculated as an average of two, opposed patterns on the disc. In an exemplary embodiment, the distance is determined during calibration of the fine tuning radial actuator. In an exemplary embodiment, this ensures that the laser is positioned directly over the media ID data when the data are read and recorded.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Other arrangements may readily be devised in accordance with these principles by those skilled in the art without departing from the scope and spirit of the invention.

What is claimed is:

1. A processor-readable medium comprising processor-executable instructions configured for:
    scanning a reference pattern on a disc to determine a radial position of a laser, wherein the reference pattern is located at a first nominal distance from a center of the disc and extends to a second nominal distance from the center of the disc, wherein the first and second nominal distances are accurate to within a nominal runout tolerance; and
    reading media ID data on the disc only when the radial position is greater than or equal to the first nominal distance plus the nominal runout tolerance and is less than or equal to the second nominal distance minus the nominal runout tolerance,
    wherein the scanning comprises:
        scanning at least a portion of a first half of the reference pattern to generate first data;
        calculating a first distance based on the first data;
        scanning at least a portion of a second half of the reference pattern to generate second data;
        calculating a second distance based on the second data; and
        averaging the first distance and the second distance to determine the distance from the center of the disc.

2. The processor-readable medium of claim 1, further comprising processor-executable instructions for moving the laser to a radial position which is greater than or equal to the first nominal distance plus the nominal runout tolerance and is less than or equal to the second nominal distance minus the nominal runout tolerance.

3. The processor-readable medium of claim 1, further comprising processor-executable instructions configured for recording the media ID data.

4. The processor-readable medium of claim 1, wherein the scanning further comprises:
    generating a reflective signal based on the reference pattern; and
    converting a duty cycle of the reflective signal into a distance value.

5. The processor-readable medium of claim 1, wherein the first half of the reference pattern and the second half of the reference pattern are 180 degrees apart from one another on the non-data side of the disc.

6. The processor-readable medium of claim 1, wherein the reference pattern has a linear variation with the radius of the disc.

7. The processor-readable medium of in claim 1, wherein the reference pattern is a sawtooth reference pattern.

8. An optical disc read-write device comprising the processor-readable medium as recited in claim 1.

9. A method for reading media ID data on a disc comprising:
    scanning a pattern on the disc to determine a radial position of a laser, wherein the pattern extends from a first nominal distance from the center of the disc to a second nominal distance from the center of the disc, and wherein the first and second nominal distances have a runout tolerance;
    moving the laser to a radial position within the read zone, wherein the read zone extends from a location on the disc a distance from the center of the disc equal to or greater than the first nominal distance plus the runout tolerance to a distance from the center of the disc less than or equal to the second nominal distance minus the runout tolerance; and
    reading and recording media ID data only when the laser is at a radial position determined to be within the read zone,
    wherein the scanning comprises:
        scanning at least a portion of a first half of the pattern to generate first data;
        calculating a first distance based on the first data;
        scanning at least a portion of a second half of the pattern to generate second data;
        calculating a second distance based on the second data; and
        averaging the first distance and the second distance to determine the distance from the center of the disc.

10. The method of claim 9, wherein the reference pattern is a sawtooth reference pattern.

11. The method of claim 9, further comprising identifying an index mark prior to scanning the pattern.

12. The method of claim 9, wherein the first nominal distance is at a position about 23 mm from an edge of a hole at the center of the disc.

13. The method of claim 9, wherein a difference between the first and second nominal distances is about 600 microns.

14. A disc drive system comprising:
    means for scanning a reference pattern on an optical disc, wherein an inner-most portion of the reference pattern is located at a nominal radial position and wherein the reference pattern has a radial dimension;
    means for determining a radial position of a laser relative to a position of the reference pattern; and
    means for reading media ID data when the radial position of the laser is within a read zone determined relative to the radial position of the reference pattern,
    wherein the read zone extends from a first position to a second position, the first position equal to the nominal radial position plus at least substantially one quarter of the radial dimension, the second position equal to the nominal radial position plus no more than substantially three quarters of the radial dimension.

15. The disc drive system of claim 14, wherein the means for scanning comprises means for generating a reflective signal representing the reference pattern.

16. The disc drive system of claim 14, wherein the means for determining the radial position of the laser relative to a position of the reference pattern comprises calculating a radius from a duty cycle of the reflective signal.

17. The disc drive system of claim 14, wherein the radial dimension is about 600 microns.

18. The disc drive system of claim 14, wherein the read zone falls within a zone extending from a first radial position corresponding to the nominal radial position plus a runout tolerance to a second radial position corresponding to the nominal radial position plus the radial dimension minus the runout tolerance.

19. The disc drive system of claim 18, wherein the runout tolerance is about 150 microns.

* * * * *

UNITED STATES PATENT AND TRADEMARK OFFICE
CERTIFICATE OF CORRECTION

PATENT NO. : 7,496,026 B2
APPLICATION NO. : 11/012831
DATED : February 24, 2009
INVENTOR(S) : Darwin M. Hanks Page 1 of 1

It is certified that error appears in the above-identified patent and that said Letters Patent is hereby corrected as shown below:

In column 15, line 48, in Claim 7, after "medium of" delete "in".

Signed and Sealed this

Eighteenth Day of August, 2009

David J. Kappos
*Director of the United States Patent and Trademark Office*